No. 861,834. PATENTED JULY 30, 1907.
O. HAMMERSTEIN.
CUTTING APPARATUS.
APPLICATION FILED JAN. 18, 1902. RENEWED SEPT. 5, 1902.
4 SHEETS—SHEET 1.
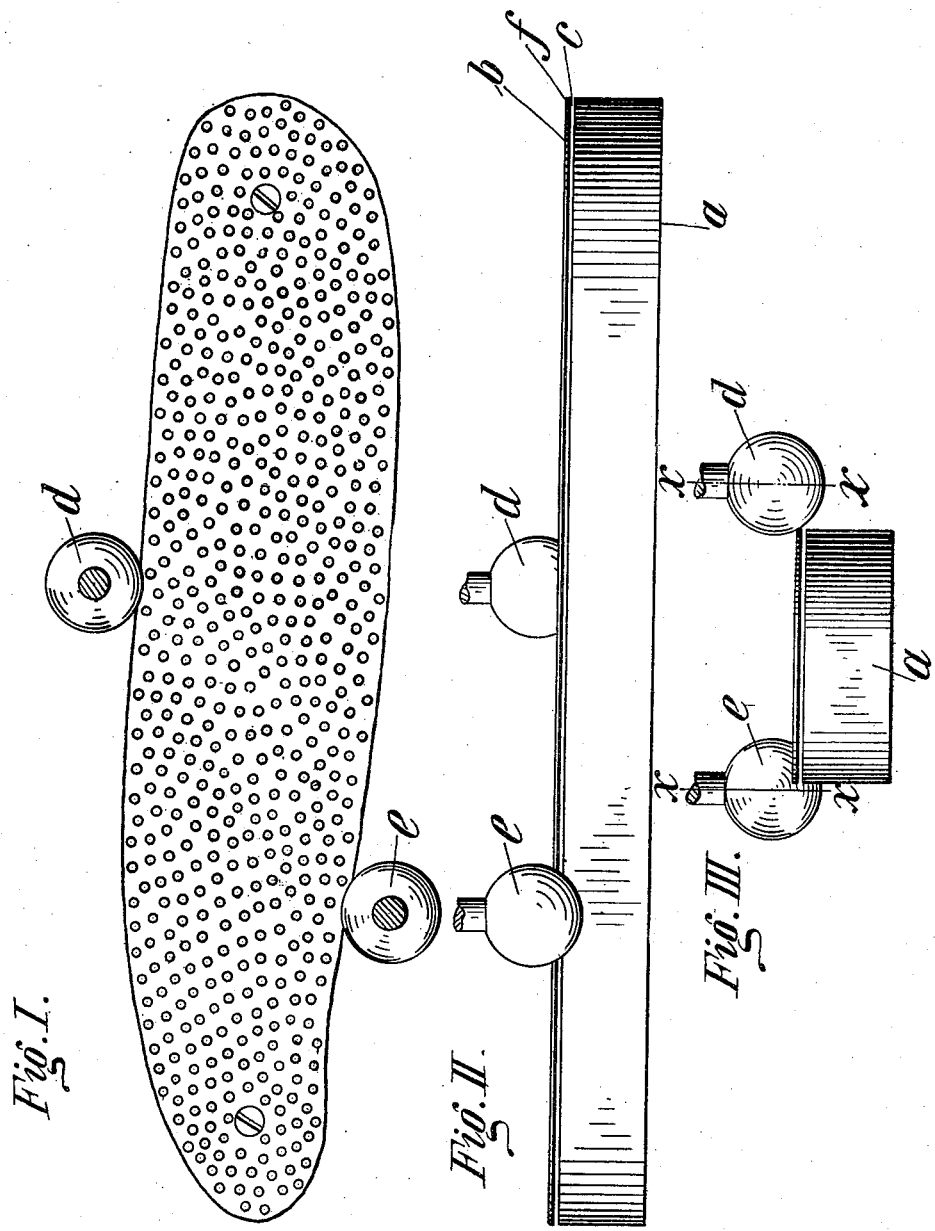
WITNESSES:
INVENTOR
Oscar Hammerstein
BY
ATTORNEYS

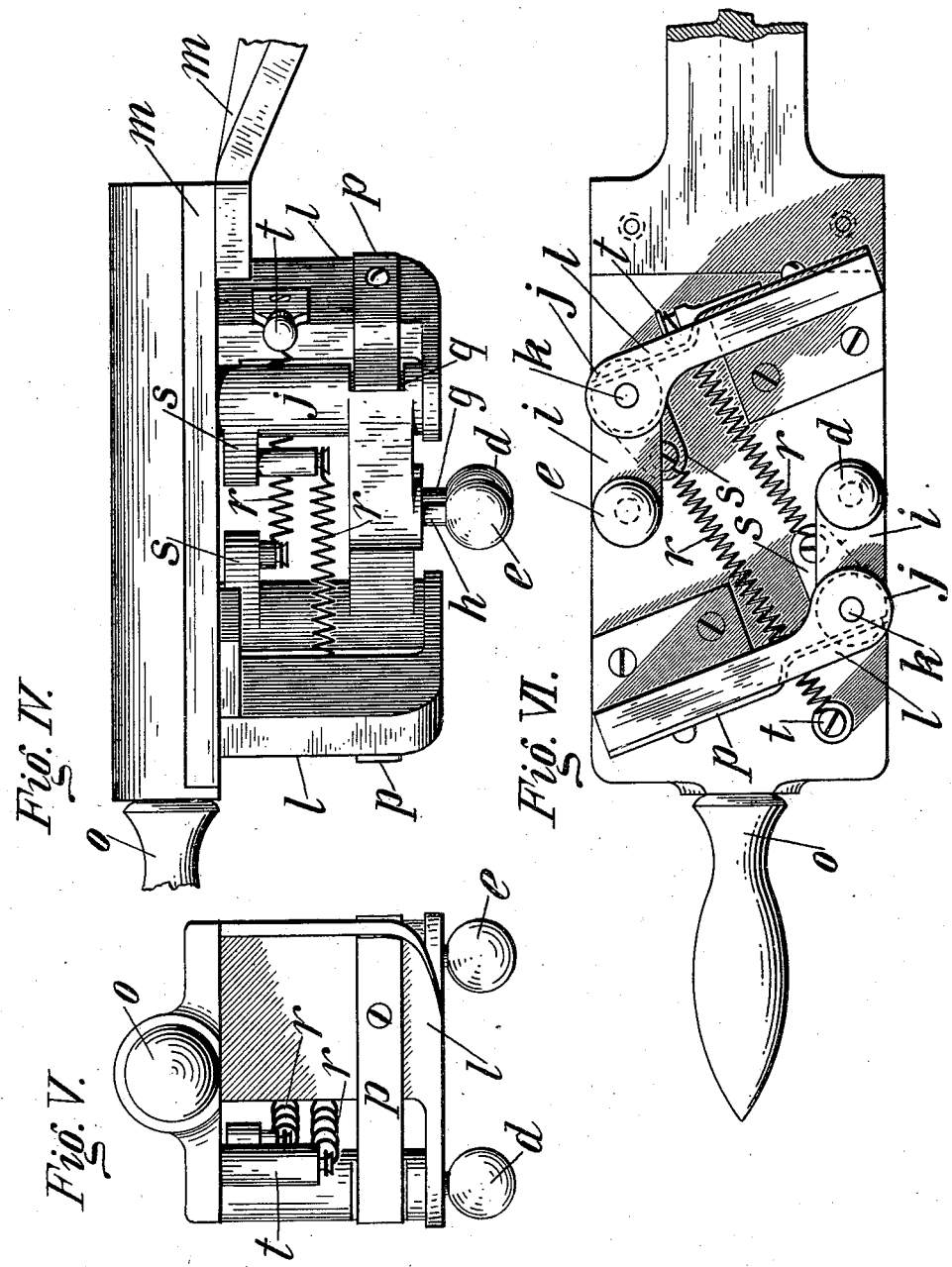

No. 861,834. PATENTED JULY 30, 1907.
O. HAMMERSTEIN.
CUTTING APPARATUS.
APPLICATION FILED JAN. 18, 1902. RENEWED SEPT. 5, 1902.
4 SHEETS—SHEET 3.
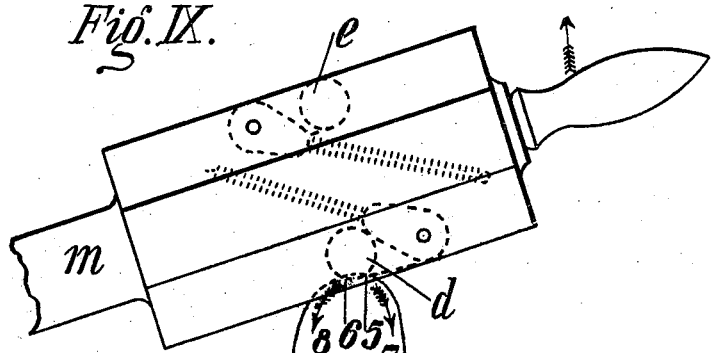
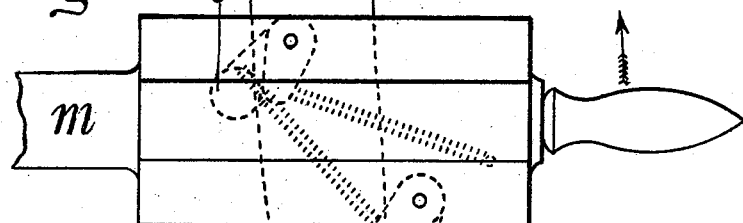
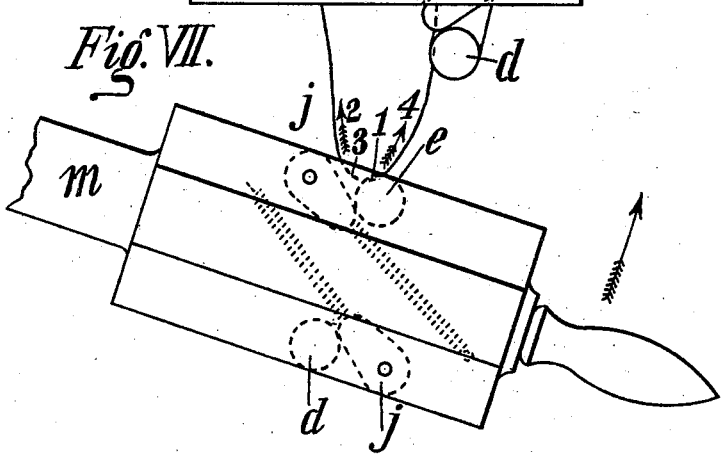

No. 861,834. PATENTED JULY 30, 1907.
O. HAMMERSTEIN.
CUTTING APPARATUS.
APPLICATION FILED JAN. 18, 1902. RENEWED SEPT. 5, 1902.
4 SHEETS—SHEET 4.
*Fig. X.*
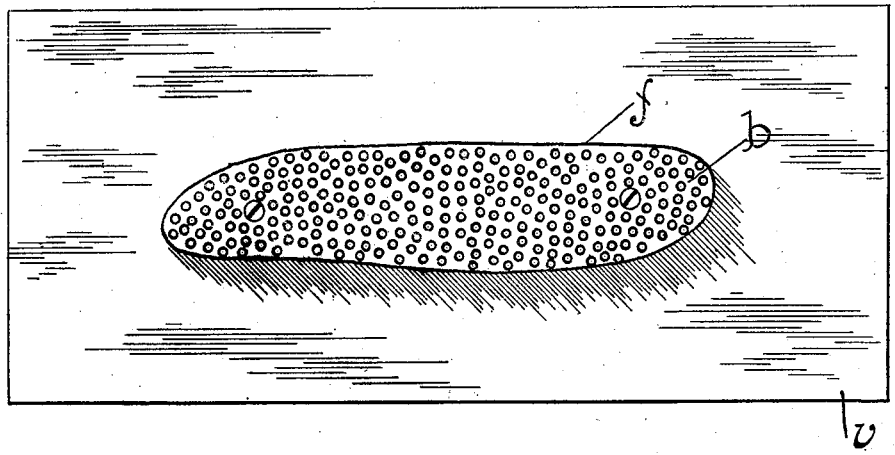
*Fig. XI.*
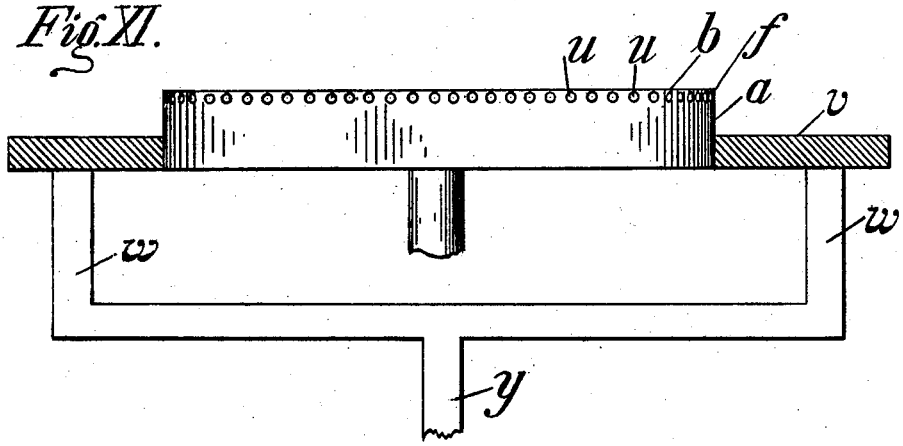
WITNESSES:
INVENTOR
BY
ATTORNEYS.

UNITED STATES PATENT OFFICE.

OSCAR HAMMERSTEIN, OF NEW YORK, N. Y.

CUTTING APPARATUS.

No. 861,834.  Specification of Letters Patent.  Patented July 30, 1907.

Application filed January 18, 1902, Serial No. 90,327. Renewed September 5, 1902. Serial No. 122,206.

*To all whom it may concern:*

Be it known that I, OSCAR HAMMERSTEIN, a citizen of the United States, and a resident of the borough of Manhattan, city, county, and State of New York, have invented certain new and useful Improvements in Cutting Apparatus, of which the following is a specification.

My invention relates to cutting apparatus which is specially adapted for cutting cigar wrappers and analogous flimsy material.

I am aware that heretofore machines have been devised and constructed for cutting cigar wrappers, but these machines have for the most part been provided with a die having an upright cutting edge all of whose parts were in substantially the same horizontal plane and over whose edge a roller was passed, to cut the leaf by downward pressure in the manner in which an ordinary punch or die is commonly operated. I have found, however, that in the machines constructed according to that principle, the cutting while fairly even along portions of the die which presented a straight edge to the roller, was in many cases wholly inefficient along portions of the die edge which were curved or irregular. This, however, while it constituted a great defect in machines of that character, nevertheless enabled a partial operation to take place which in case of the cutting and rolling table could be completed by the thumb of the operator pressing the uncut portions of the wrapper. But where a very quick cutting action is desired as is sometimes necessary, the failure to cut the wrapper on the sharp curves constitutes a very serious defect in wrapper-cutters, and it is the object of my invention to overcome this defect. This I accomplish by cutting the wrapper, not by direct pressure against the sharpened edge of the knife in the form of a die, but by pressing a suitable traveler laterally against the edge of a plate or other sheet support and producing relative movement between the said support and traveler so as to cause the traveler to run around the said edge.

In the accompanying drawings I have shown a suction box provided with an elevated plate and also in another figure provided with apertures at the sides, the sides and top of the box forming a unitary structure, and for the travelers I have shown balls which are the best means at present known to me for carrying out my invention.

In the accompanying drawing I have shown by way of illustration a cutting apparatus in which one form of my invention is embodied, it being understood that my invention is not limited thereto.

In these drawings, Figure I is a plan view of a cigar wrapper cutter showing the main operative parts of a machine in which my invention is embodied; Fig. II is a side view thereof; Fig. III is an edge view showing the interaction between the edge of the suction box or wrapper cutter and the coöperating balls; Fig. IV is a side view of the cutter arm with yieldingly supported balls; Fig. V is an end view thereof; Fig. VI is an underneath plan view; Figs. VII, VIII and IX are diagrammatic views showing the mode of operation of the device; Fig. X is a plan view of a combined suction box, wrapper cutter and rolling table; and Fig. XI is a sectional side elevation of the same, showing means whereby the rolling table may be raised and lowered.

In the drawings *a* indicates a suitable suction box, shown in the present instance as of the general shape of a cigar wrapper and (in Figs. II and III) provided with a perforated wrapper support or suction plate *b* suitably supported so as to leave a narrow space *c* for the influx of air for a purpose presently to be explained.

*d* and *e* are suitable balls. These balls are carried rotatively as will be described and rotate on the axes $x$—$x$ and coöperate with the edge or corner *f* of the suction plate or cutter *b*. The balls *d*—*e* are carried respectively on rods or spindles *g*—*h*. Each of the rods or spindles *g h* is carried upon an arm *i* rigidly secured to a hub *j*, pivotally carried upon a stud *k* supported by bracket *l* rigidly carried by the arm *m*. This arm *m* is in the present instance pivoted in the rear of the machine and is or may be provided with a suitable handle *o* by which it may be manipulated, it being understood, however that nothing herein contained shall be construed to limit the present invention to a manually operated machine, or to exclude a machine operated by power.

A suitable leaf spring *p* bears against a flattened portion *q* of the hub *j* and operates in conjunction with the spring *r* to restore the ball *d* or *e* to a normal position shown in Figs. IV, V and VI. This spring *r* is secured at one end to a stud on the arm *s* carried by the hub *j* and at the other end to a fixed stud *t* on the frame of the arm *m*.

The end of the arm *m* which carries the balls is shown as traveling in an arc about a center as clearly shown in Fig. IX and as it travels the balls *d*—*e* are caused to run around the edge of the suction plate of the suction box *a*.

Examination of Fig. III will develop the fact that the balls run on the corner or lateral edge of the suction plate *b*.

I have found by long experience that a die having a vertical cutting edge does not cut the leaf satisfactorily, whether a plunger be employed to come down upon the die, or traveling rollers which press downwardly upon the upwardly extending cutting edge be employed. I have found that in employing such structure some portion of the leaf is not properly cut and it is necessary for the operator to press away the defectively cut portion of the leaf with his thumb. These objections I obviate by employing what, for the lack of a better term, I call a lateral cutting edge.

In the present instance it is shown as a corner and wherever I use the term "lateral or laterally" either with respect to the cutting edge or the travelers I mean to be understood in this sense; namely, an edge extending laterally rather than vertically of the travelers, or in line with the movement of the plunger. I also, in the specification and claims, employ the terms cutter and cutter member in analogous senses inasmuch as the cutter member is a cutter so long as it is one member of the cutting device.

In Figs. VII, VIII and IX, I have shown in diagram the travel of the balls. In these figures the arm is supposed to be moving in an upward direction on the sheet as indicated by the arrows. The ball $e$ contacts with the edge of the suction plate, let us say, at the point 1 and as the arm travels the hub $j$ will swing on its pivotal mounting and the ball $e$ will travel around the edge of the suction plate in the direction indicated by the arrow 2, the arm carrying the ball trailing behind the pivotal point on which its carrier arm is mounted to turn. The ball $d$ will under these circumstances strike the edge of the suction plate at about the point 3 and will travel in the direction of the arrow 4 over such edge. Thus on the movement of the arm in one direction, the part of the suction plate between the points 1 and 3 will be traversed once by each ball. The balls $d$ and $e$ are pulled against the edge of the suction plate or cutter by the springs $r$ which thus cause the said balls to exert a lateral pressure in a direction parallel with the plane of said cutter. As the arm $m$ travels the ball $e$ will be the first to leave the plate $b$ and this will take place at or about the point 5. Subsequently the ball $d$ will leave the plate $b$ at or about the point 6, so that between the points 5 and 6 both balls will traverse the suction plate. The arm $m$ may now make a return stroke, the ball $d$ contacting with the suction plate at or about the point 6 and passing in the direction of the arrow 7 and the ball $e$ contacting at or about the point 5 and passing in the direction of the arrow 8. The arm $m$ continues to travel and at the proper moment the ball $d$ passes off the suction plate at or about the point 1. It will thus be seen that in case of necessity while a single wrapper is on the suction box, all parts of the edge of the wrapper where the cutting takes place are traversed at least twice by a ball and on the sharp curves, to wit, at the ends of the plate are traversed four times by the balls, thus insuring a very efficient cutting.

The detailed mode of operation is as follows: The wrapper is spread out smoothly upon the suction plate $b$ and pressed around the edge thereof, and side of the suction box, so that the air suction will act not only over the entire surface of the suction plate, but by acting in the narrow space between the suction plate and the suction box will hold the edges of the leaf firmly around the edge of the suction box. Relative movement may now be produced between the balls and the suction box in any desired manner, as the balls traverse or are traversed over the edge $f$ of the suction box the wrapper will be cut into the desired form. This wrapper may now be manipulated or disposed of in any desired manner.

It will be understood that while I have referred to the balls as traveling I do not necessarily mean to restrict myself to moving the balls with respect to the suction box or plate, but desire to include within my claims such equivalent structures as may be justified by the state of the art.

In Fig. XI, I have shown a suction box $a$ having a perforated top suction plate $b$ forming therewith a unitary structure having a corner $f$, and have provided a series of apertures $u$ around the box below the top to subserve the function performed by the slot or opening $c$ shown in Figs. II and III. Surrounding the suction box is a suitable table $v$. This table $v$ has connected therewith a yoke $w$ which is adapted to be actuated by a rod $y$ which rod may be raised or lowered in any suitable manner. Balls, which are not shown in Figs. X and XI are employed to effect the cutting. The mode of operation is as follows: When the cutting of the wrapper takes place the table $v$ is lowered, and when the cutting has been effected the said table may be raised flush or substantially so with the suction plate and the bunch placed on the wrapper so that the suction plate and rolling table will together coöperate to form a smooth surface upon which the rolling of the cigar may be effected.

Having described my invention what I claim and desire to secure by Letters Patent is:

1. The combination, in a cigar wrapper cutter, of a cutter member having a peripheral lateral cutting edge a traveler movable peripherally of said lateral edge and means for causing said edge to be traversed by the peripherally moving traveler while a flimsy sheet is located upon said edge in position to be cut, whereby the said sheet may be cut into the form of a cigar wrapper.

2. In a cutting device for cigar wrappers, the combination of a cutter having a lateral peripheral cutting edge, rotating travelers and means for traversing the said edge by the said rotating travelers.

3. In a wrapper cutter, the combination of a cutter having a lateral cutting edge against which a sheet is adapted to be held, and a plurality of travelers provided with means for causing relative movement between the said edge and travelers whereby the said travelers will jointly traverse the periphery of the said edge.

4. In a cigar wrapper cutter, the combination of a cutting device having a lateral cutting edge, a suitable traveler coöperating with said edge and means for causing relative motion between the cutting device and traveler whereby a wrapper held upon the said cutting device may be cut by the action of a peripherally running traveler.

5. In a device for cutting cigar wrappers, the combination of a cutting device having a lateral cutting edge and a plurality of peripherally moving rotary devices held against the said lateral edge to effect the cutting, with means for effecting relative movement between said edge and the rotary devices.

6. In a device for cutting cigar wrappers, the combination of a support for a sheet having a peripheral cutting edge, a traveler bearing laterally against said peripheral edge, means for effecting a relative movement of translation between the traveler and the edge whereby a peripheral cut may be executed by the peripherally moving traveler.

7. In a cutting device for cigar wrappers, the combination of a suction device having a peripheral cutting edge and a traveler for traversing the said edge of the said suction device and held thereto by lateral pressure and means for producing lateral pressure.

8. In a cigar wrapper cutter, the combination of a suction box having a perforated wrapper support, air-inlet means below the wrapper support whereby the said wrapper may be held around the peripheral edge of the said wrapper support and means coöperating with the said peripheral edge for cutting the wrapper by lateral pressure and means for producing lateral pressure.

9. In a machine for cutting cigar wrappers, the combination of a wrapper support having a cutting edge, and means adapted for peripherally traversing the said edge and bringing pressure to bear thereon laterally of the said edge and means for producing lateral pressure.

10. In a device for cutting cigar wrappers, the combination of a perforated wrapper support having a lateral cutting edge and a plurality of rotary balls adapted to be traversed against the said edge and held thereto by lateral pressure, whereby a wrapper may be cut by a laterally acting cutting device and means for producing lateral pressure.

11. In a device for cutting cigar wrappers, the combination of a wrapper support having a lateral cutting edge, sharply curved at predetermined points, and means coöperating with the said edge by lateral pressure to cut the said wrapper, the said means making a plurality of traverses over the said sharply curved points and means for producing lateral pressure.

12. A device for cutting cigar wrappers comprising a cutter having a laterally disposed cutting edge, a plurality of independent pivotally mounted travelers coöperating therewith, and means for impelling the said travelers laterally against the said lateral cutting edge.

13. In a cigar wrapper cutter, the combination of a plurality of independently mounted travelers and a wrapper support having a lateral cutting edge, combined with means for causing the said travelers to exert lateral pressure against the said edge.

14. The combination of a suction device having a lateral cutting edge with a rising and falling table, adapted to be so positioned, with respect to said suction device as to constitute therewith a cigar rolling table.

15. In a cigar making apparatus, the combination of a suction device having a lateral cutting edge, a traveler traversing the said edge and exerting lateral pressure thereon, and a movable table coöperating with said suction device to form therewith a rolling table.

16. The combination, in a cigar wrapper cutter, of a cutter member having a lateral cutting edge, and edge traversing means pressed laterally against the said edge.

17. In a cigar making apparatus, the combination of a suction device having a lateral cutting edge, a rotary traveler traversing said edge and exerting lateral action thereon, and a table coöperating with said suction device and traveler to form a rolling table.

18. A device for cutting cigar wrappers comprising a cutter, a traveling pressure device adapted to coöperate therewith, and means for causing said traveling device to exert a pressure on said cutter in a direction parallel with the plane thereof.

19. A device for cutting cigar wrappers comprising a cutter, a plurality of traveling pressure devices adapted to coöperate therewith and means for causing said traveling devices to exert a pressure toward each other on said cutter in a direction parallel with the plane thereof.

20. A device for cutting cigar wrappers, comprising a cutter, a traveling arm arranged to move adjacent thereto, and a pressure device pivoted to said arm about an axis perpendicular to the plane in which the arm moves, and arranged to engage the cutter.

21. A device for cutting cigar wrappers, comprising a cutter, a traveling arm arranged to move adjacent thereto, and a pressure device carried by said arm and movable relatively thereto in a plane parallel to that in which the arm moves, said pressure device being arranged to engage the cutter.

OSCAR HAMMERSTEIN.

Witnesses:
GEO. E. MORSE,
CONRAD KREMP.